(12) United States Patent
Yoon et al.

(10) Patent No.: US 11,106,667 B1
(45) Date of Patent: Aug. 31, 2021

(54) TRANSACTIONAL SCANNING OF PORTIONS OF A DATABASE

(71) Applicant: Amazon Technologies, Inc., Seattle, WA (US)

(72) Inventors: Yongsik Yoon, Sammamish, WA (US); Gopi Krishna Attaluri, Cupertino, CA (US); Kamal Kant Gupta, Seattle, WA (US); Yingjie He, Cupertino, CA (US); Saileshwar Krishnamurthy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 15/871,868

(22) Filed: Jan. 15, 2018

(51) Int. Cl.
*G06F 7/00* (2006.01)
*G06F 16/2453* (2019.01)
*G06F 3/06* (2006.01)
*G06F 16/22* (2019.01)
*G06F 16/23* (2019.01)

(52) U.S. Cl.
CPC ........ *G06F 16/2453* (2019.01); *G06F 3/0611* (2013.01); *G06F 16/2272* (2019.01); *G06F 16/2365* (2019.01)

(58) Field of Classification Search
CPC ............. G06F 16/2453; G06F 16/2272; G06F 16/2365; G06F 3/0611
USPC ......................................... 707/600–899, 713
See application file for complete search history.

(56) References Cited

U.S. PATENT DOCUMENTS

| | | | | |
|---|---|---|---|---|
| 6,341,281 | B1 * | 1/2002 | MacNicol | ......... G06F 16/24539 |
| 2010/0174833 | A1 * | 7/2010 | Filer | ....................... G06F 16/24 710/8 |
| 2011/0137890 | A1 * | 6/2011 | Bestgen | ............ G06F 16/24544 707/719 |
| 2019/0057133 | A1 * | 2/2019 | Chainani | ........... G06F 16/24564 |

OTHER PUBLICATIONS

Peter Boncz, et al., "MonetDB/X100: Hyper-Pipelining Query Execution", Proceedings of the 2005 CIDR Conference, 2005, pp. 1-13.
Juliusz Sompolski, "Just-in-Time Compilation in Vectorized Query Execution", Doctoral Dissertation, MSc thesis, 2011, pp. 1-92.
Viktor Leis, et al "Morsel-Driven Parallelism: A NUMA-Aware Queryy Evaluation Framework for the Many-Core Age", ACM SIGMOD, 2014, pp. 1-12.

* cited by examiner

*Primary Examiner* — Isaac M Woo
(74) *Attorney, Agent, or Firm* — Robert C. Kowert; Kowert, Hood, Munyon, Rankin & Goetzel, P.C.

(57) ABSTRACT

Transactional scans of portions of a database may be performed. When a query is received that causes a scan of a database, different portions of the database may be scanned within separate transactions. Operations applicable to perform the scan the records of the different portions of the database may be invoked once within the transactions instead of invoking the operations individually for each of the records in the different portions. Results of the query based on the scanned portions may then be provided in response to the query.

20 Claims, 8 Drawing Sheets

TRANSACTIONAL SCANNING OF PORTIONS OF A DATABASE

BACKGROUND

As the size and scale of data sets grow, the costs to search, analyze, and otherwise manage data sets increases correspondingly. Queries on data sets, for example, increase both in time and utilization of resources in order to query over large data sets. While increasing performance capabilities of computing devices to process queries can somewhat dampen the effects of performing costly queries, techniques that reduce the performance costs of queries without resorting to changing the underlying resources may be desirable to further offset the burdens query processing over large data sets incurs.

Figure 1:
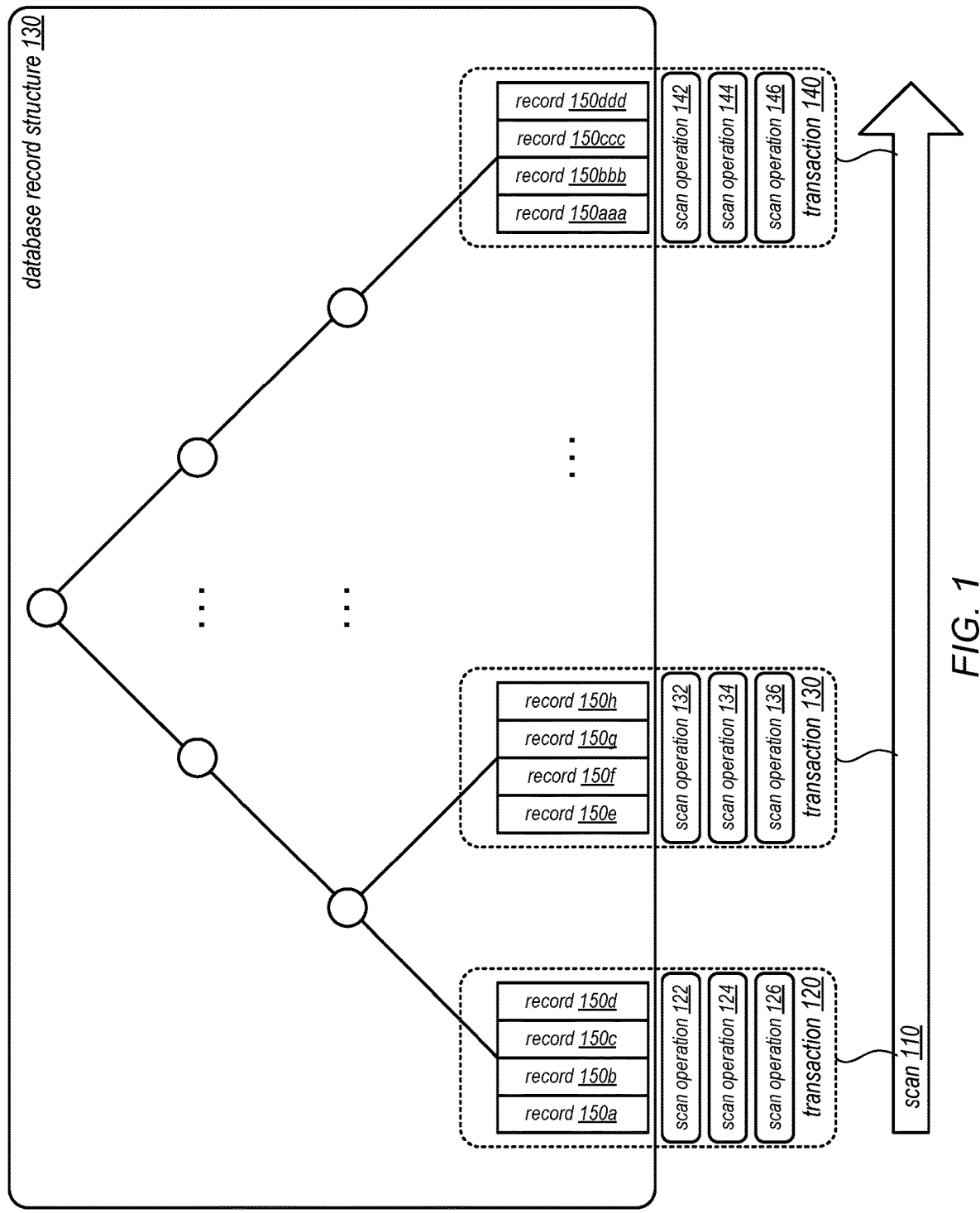
FIG. 1 is a logical block diagram that illustrates transactional scanning of portions of a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims.

Various components may be described as performing a task or tasks. In such contexts, the performance of tasks may be a broad recitation generally meaning "having structure that" performs the task or tasks during operation. As such, the component may be able perform the task even when the component is not currently performing that task (e.g., a computer system may be able to perform operations even when the operations are not currently being performed). In some embodiments, a component described as performing a task or tasks may be a broad recitation of structure generally meaning "having circuitry that" performs the task or tasks during operation. As such, the component can perform the task even when the component is not currently on. In general, the circuitry that forms the structure corresponding may include hardware circuits.

Various components may be described as performing a task or tasks, for convenience in the description. Reciting that a component performs one or more tasks is expressly intended not to invoke 35 U.S.C. § 112 (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of transactional scanning of portions of a database are described herein. Scanning operations may be performed in order to search for and return data in response to many different queries directed to a database, in some embodiments. Tables, indexes, or other structures of a database that store, link to, project, or mirror records of a database may be scanned according to an ordering (e.g., logical ordering or physical ordering) of records to ensure that any possible instance of a record that satisfies a query may be returned as part of a result for the query, in some embodiments. Because scan operations may search every record of a table, index, or other structure of database, in some embodiments, scan operations can be costly to perform. Transactional scanning of portions of a database may be implemented in various embodiments to leverage transaction guarantees offered by a database, ensuring Atomicity, Consistency, and Isolation, in order to share the costs of performing a scan amongst multiple records of a database. In this way, batches, groups, or other portions of records of a database may be scanned without incurring the penalties of overhead and other processing costs of scanning records individually, in various embodiments.

FIG. 1 is a logical block diagram that illustrates transactional scanning of portions of a database, according to some embodiments. Database record structure 130 may be a database table, index or other data structure (e.g., a tree structure) which may provide an ordering or arrangement of records of a database, in some embodiments. Database records, such as records 150a, 150b, 150c, 150d, 150e, 150f, 150g, 150h, 150aaa, 150bbb, 150ccc, and 150ddd, may be entries, rows, or objects within database record structure that contain one or more values in respective fields (which may be mapped to columns in a table schema for the database), in some embodiments.

Access may be provided to database records 120 in database record structure 130 in response to a queries received at a database (e.g., at a database management system or query engine as illustrated below in FIG. 3), in some embodiments. Scans of the database records 120 in database record structure 130, such as scan 110 may be triggered in response to a query. As illustrated in FIG. 1, groups, batches, or portions of the database stored in database record structure 130 may be scanned in individual transactions, such as transactions 120, 130, and 140. Transactions may prevent access to the underlying records (and state information associated with the records or scan operations) applied to the records within a transaction, in some embodiments, (e.g., a system transaction, such as MySQL's mini-transaction, may be one type of transaction procedure or function that may be invoked to provide transactional scanning, in one embodiment). Transaction semantics, as discussed below with regard to FIGS. 6 and 7, such as "start" and "commit", may be implemented to isolate performance of a scan to the records included in the transaction, in some embodiments. In this way scan operations can be performed that can be invoked once for the group, batch, or portion of records, dividing the costs of performing the operations amongst the records included in the transaction. For example, as discussed below with regard to FIG. 7, scan operations, such as scan operations 122, 124, 126, 132, 134, 136, 142, 144, and 146, may be performed once per transaction to store or update location information for the scan (e.g., cursor information), determine the locations of fields within the records (e.g., offset calculations), format conversions or other manipulations of the data to be ready for further evaluation (e.g., conversion from storage format to logical format), and evaluation of field values for the scan (e.g., according to query predicates), in some embodiments. In this way, processing overhead for performing a single operation once for a transaction can greatly reduce the cost of performing scan 110 overall (e.g., achieving multi-factor performance improvements, such as 3×, 4×, or 5× improvements in time elapsed for performing a query).

Figure 6:
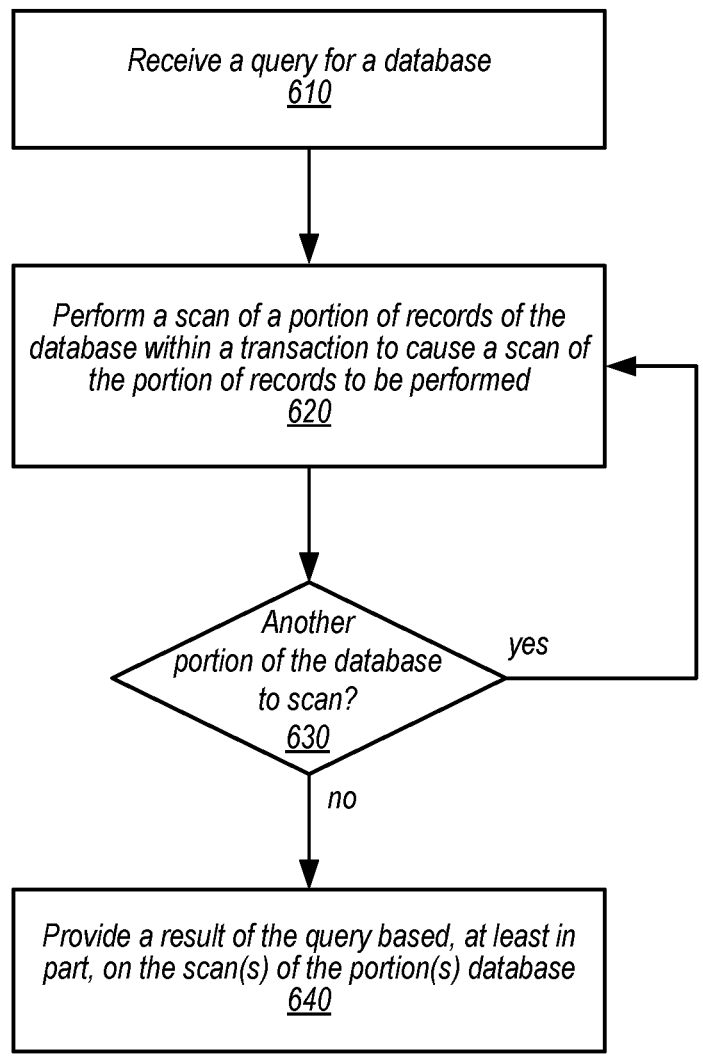
FIG. 6 is a high-level flowchart illustrating various methods and techniques to implement transactional scanning of portions of a database, according to some embodiments.

Further optimizations, such as those discussed below with regard to FIGS. 4, 6, and 7, applying just-in-time compilation to perform batch, group, or portion-wise application of operations for scan 110, may further increase performance. Batch, group, or portion size adjustments for scanning within a transaction, as discussed below with regard to FIG. 4 may provide administrators or users with the capability to adjust transaction scanning performing according to the configuration of the database being scanned, in some embodiments. Operation selection, as discussed below with regard to FIGS. 4, 6, and 7, may apply operations in batch-wise fashion when applicable or combine record-by-record operation application within batch-wise application of operations within a single transaction, in some embodiments.

Please note FIG. 1 is provided as a logical illustration of transactional scanning of portions of a database, and is not intended to be limiting as to the arrangement or configuration of a database record structure, record, scan or scan operation.

The specification first describes an example of a database service that may implement transactional scanning of portions of a database, according to various embodiments. The example database service may host data for many different types of clients, in various embodiments. Included in the description of the example network-based database service are various aspects of the example network-based database service along with the various interactions between the database service and a separate storage service which may store the data on behalf of the database service. The specification then describes a flowchart of various embodiments of methods for transactional scanning of portions of a database. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit access requests and data schema modifications using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., request processing, transaction management, caching and storage) into tiers that may be individually and independently scalable, in one embodiment. For example, in one embodiment, each database instance in the systems described herein may include a database tier (which may include a single database engine head node and a client-side storage system driver), and a separate, storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a storage system, and distributed across multiple nodes and storage devices, in one embodiment. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space, in one embodiment. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

Figure 2:
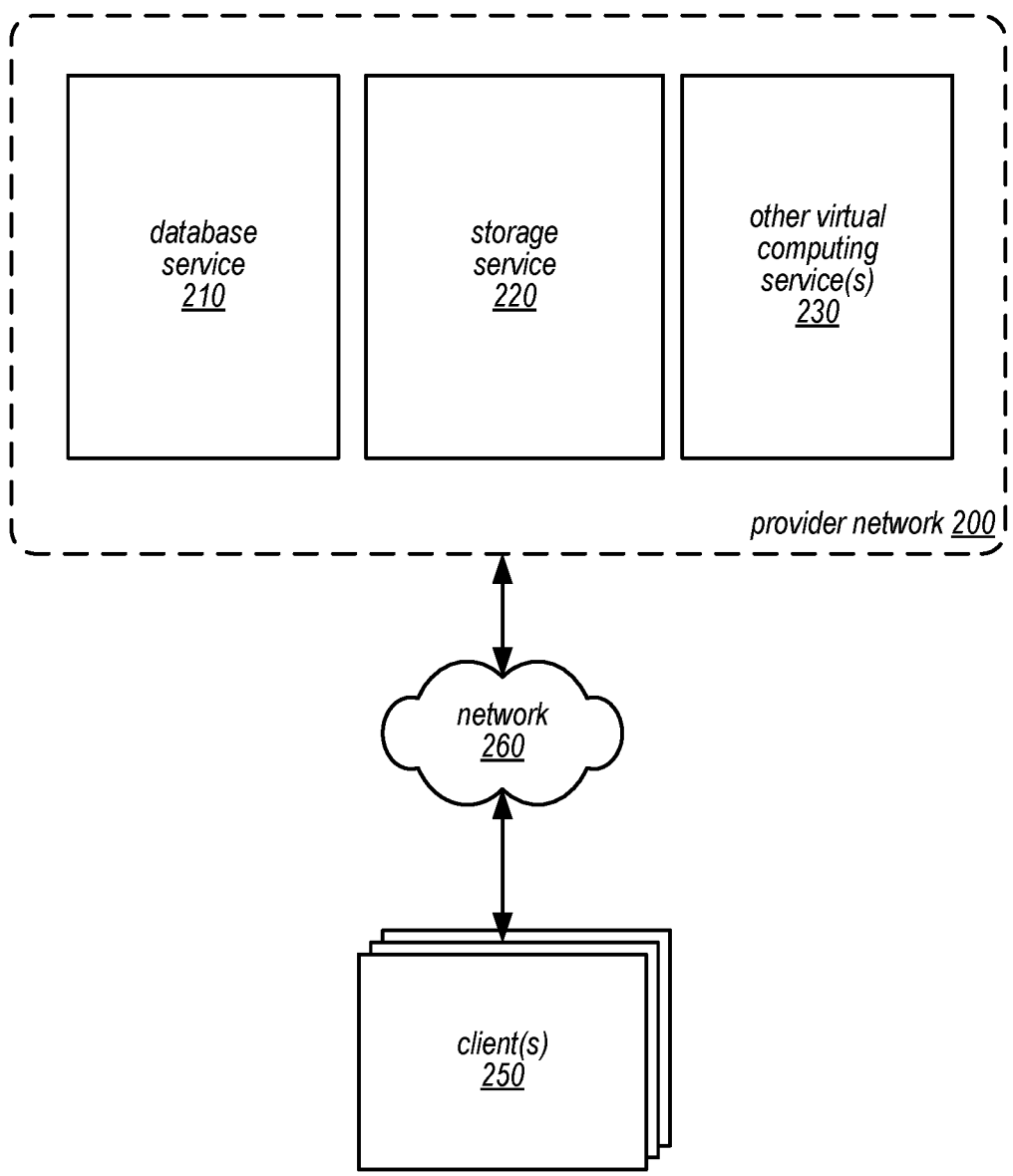
FIG. 2 is a logical block diagram illustrating a provider network implementing a network-based database service and a network-based storage service that may implement a database system that can perform transactional scanning of portions of a database, according to some embodiments.

FIG. 2 is a logical block diagram illustrating a provider network implementing a network-based database service and a network-based storage service that may implement a database system that can perform transactional scanning of portions of a database, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may implement a database service 210, a storage service 220 and/or one or more other virtual computing services 230 (which may include various other types of storage, processing, analysis, communication, event handling, visualization, and security services). Storage service 220 may be implemented as log-structured storage using a single log sequence number space, in one embodiment. Clients 250 may access these various services offered by provider network 200 via network 260. Likewise network-based services may themselves communicate and/or make use of one another to provide different services. For example, storage service 220 may store data for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction with respect to a database, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to network-based services platform 200 may be coordinated by client 250 and the operating system or file system on behalf of applications executing within the operating system environment.

Client(s) 250 may convey network-based services requests (e.g., a request to query a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 230 for processing.

In some embodiments, provider network 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
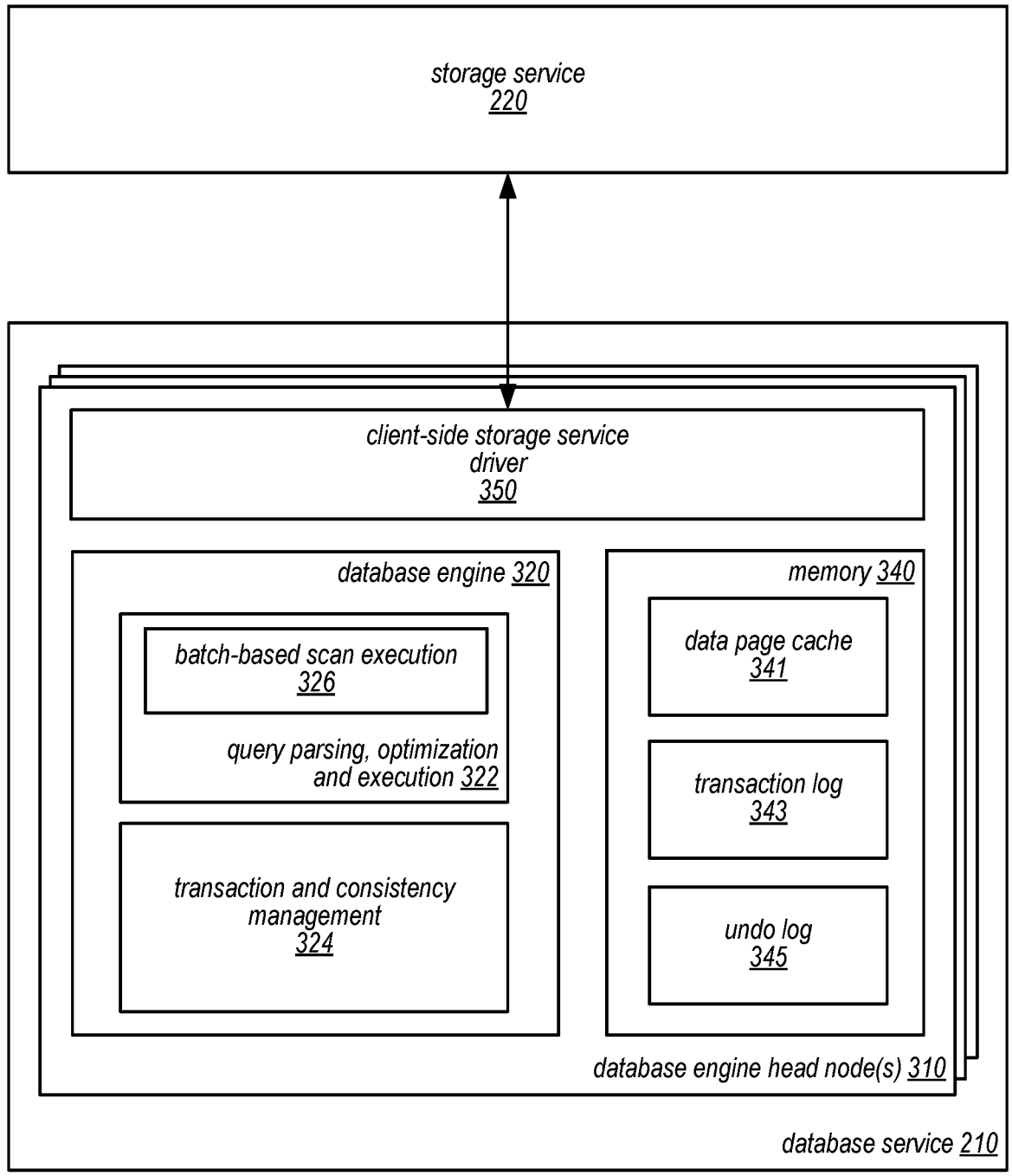
FIG. 3 is a logical block diagram illustrating various components of a database service that includes a database engine that implements transactional scanning of portions of a database for different batches of records of the database, according to some embodiments.

FIG. 3 is a logical block diagram illustrating various components of a database service that includes a database engine that implements transactional scanning of portions of a database for different batches of records of the database, according to some embodiments. In this example, database service 210 includes a respective database engine head node 310 for each of several databases and a storage service 220 (which may or may not be visible to the clients of the database system). Clients may access a database head node 310 via network (e.g., network 260 in FIG. 2). In one embodiment, database engine head node(s) 310 may be network-addressable and accessible to the database clients directly. In one embodiment, storage service 220, which may be employed by the database service 210 to store a database volume (such as data pages of one or more databases, as well as redo log records and/or other metadata associated therewith) on behalf of database clients, and to perform other functions of the database system as described herein, may or may not be network-addressable and accessible to the database clients, in different embodiments. For example, in some embodiments, storage service 220 may perform various storage, access, change logging, recovery, log record manipulation, and/or space management operations in a manner that is invisible to database clients.

As previously noted, each database instance may include a single database engine head node 310 that receives requests (e.g., access requests, transactions, etc.) from various client programs (e.g., applications) and/or subscribers (users), then parses them, optimizes them, and develops a plan to carry out the associated database operation(s). In the example illustrated in FIG. 3, a query parsing, optimization, and execution component 322 of database engine 320 may perform these functions for queries that are received from a database client and that target the database instance of which database engine head node is a component. In some embodiments, query parsing, optimization, and execution component 322 may return query responses to a database client, which may include write acknowledgements, requested data pages (or portions thereof), error messages, and or other responses, as appropriate. For queries received at database engine head node 310 that trigger or cause performance of a scan operation as part of executing or performing a plan for a query that identifies the scan operation, various techniques for performing transactional scanning for batches, groups, or other portions of a database within a transaction, such as discussed in detail below with regard to FIGS. 4, 6, and 7, may be performed by query parsing, optimization, and execution component 322. For example, for individual batches of records of a database (e.g., in a table, primary index, or secondary index), query parsing, optimization, and execution component 322 may start a transaction to ensure consistent reads to the scanned batch of records and allow for operations applicable to the batch of records to be performed, and commit the transaction once the scan of the batch of records is complete, in some embodiments.

Database engine head node 310 may also implement a data store, like memory 340, in various embodiments, to maintain data for performing various database engine tasks. For example, in one embodiment, memory 340 may include a data page cache 341, in which data pages that were recently accessed may be temporarily held. Other examples of data included in memory 340 to perform database engine tasks are discussed below.

As illustrated in FIG. 3, database engine head node 310 may also include a transaction and consistency management component 324, which may be responsible for providing transactionality and consistency in the database instance of which database engine head node 310 is a component, in one embodiment. For example, this component may be responsible for ensuring the Atomicity, Consistency, and Isolation properties of the database instance and the transactions that received from a client (or invoked in order to perform database operations such as scanning portions of database) by managing a list of transactions being performed with respect to the database in transaction log 343 in memory 340, creating, updating, and reclaiming data from undo log 345 to provide multi-version concurrency control (MVCC) for transactions executed by database engine 310 and roll back any locally cached results of transactions that do not commit, in one embodiment.

Database engine head node 310 may also include a client-side storage service driver 350, which may route read requests and/or redo log records to various storage nodes within storage service 220, receive write acknowledgements from storage service 220, receive requested data pages from storage service 220, and/or return data pages, error messages, or other responses to query parsing, optimization, and execution component 322 (which may, in turn, return them to database client), in one embodiment. Client-side storage service driver 350 may maintain mapping information about the database volume stored in storage service 220, such that a particular protection group maintaining a partition of the database volume may be determined. Read requests and redo log records may then be routed to storage nodes that are members of the protection group according to the partition of user data to which the read request is directed or to which the redo log record pertains, in one embodiment.

Figure 5:
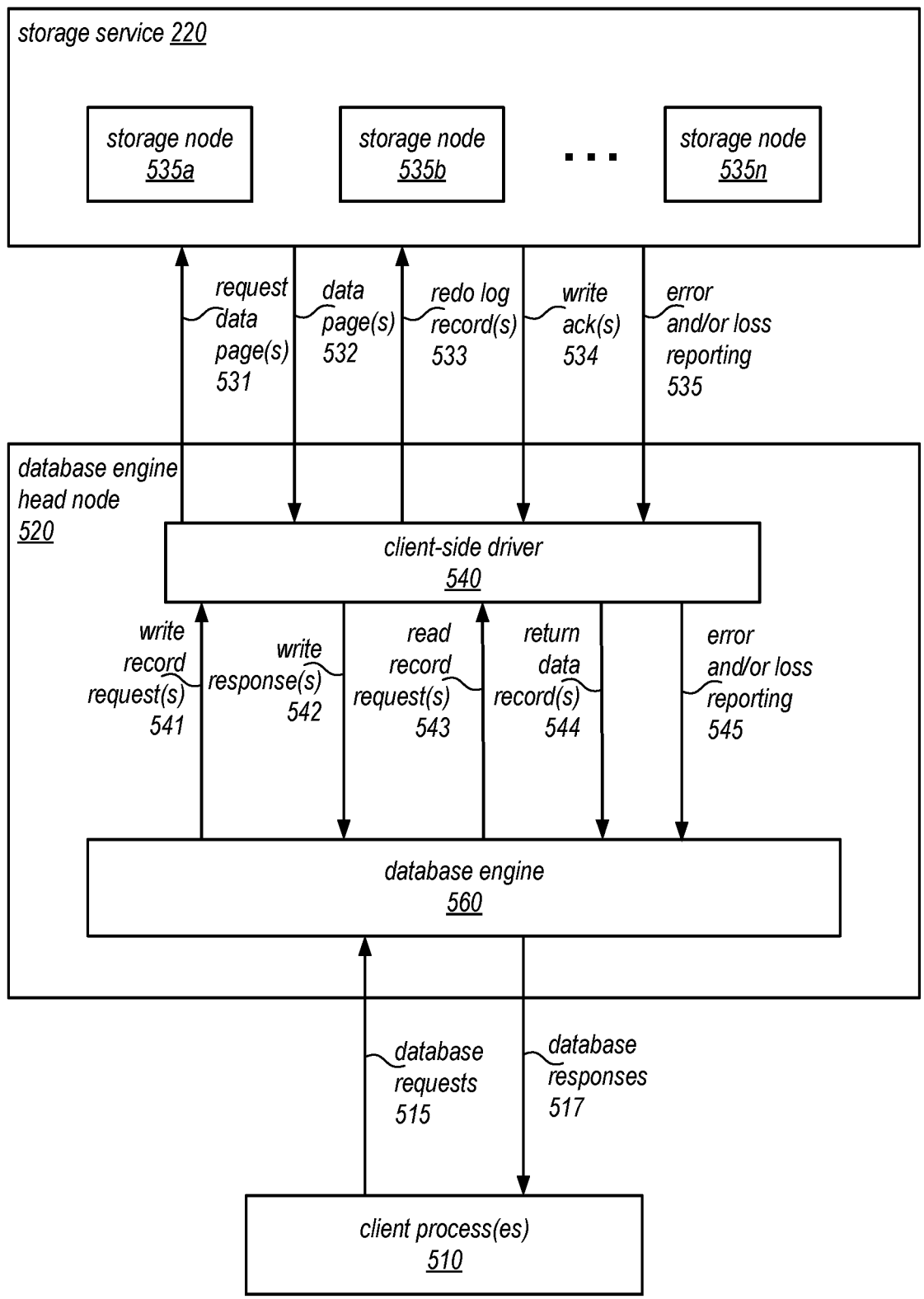
FIG. 5 is a logical block diagram illustrating the use of a separate distributed storage system in a database system, according to some embodiments.

In some embodiments, storage service 220 may implement multiple storage nodes (as illustrated in FIG. 5) which may store data for different clients as part of a multi-tenant storage service. In some embodiments, database engine head nodes 310 may be a client of storage service 220, which communicates with a database engine head node 310 over connection in a provider network 200. Each storage node may include hardware and/or software to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers), in various embodiments.

Storage nodes of storage service 220 may store data for a database managed in database service 210, such as data page(s) and segment redo log(s) for the database as part of a database volume, and may perform various segment management functions. Storage nodes may include attached SSDs, which may be persistent storage devices, in some embodiments. In some embodiments, storage nodes may implement a set of processes running on the node server's operating system that manage communication with a database engine head node, e.g., to receive redo logs, send back data pages, etc. In some embodiments, all data blocks written to the distributed storage system may be backed up to long-term and/or archival storage (e.g., in a remote key-value durable backup storage system).

Figure 4:
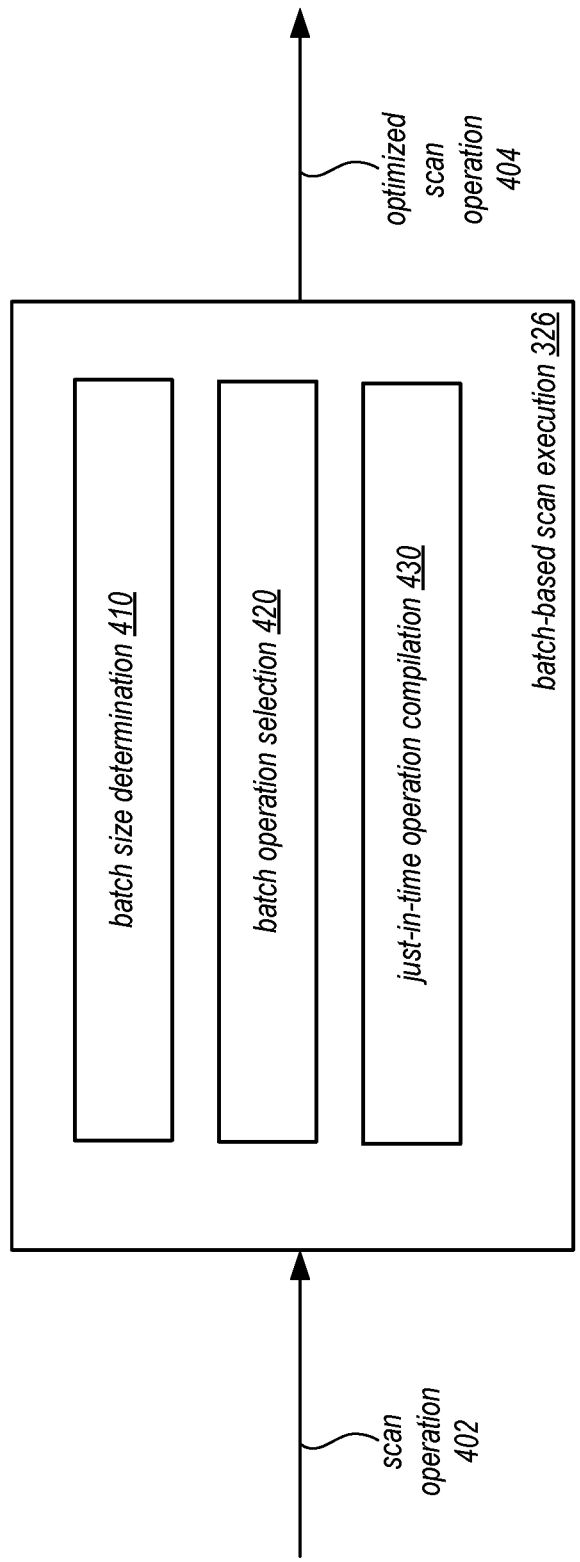
FIG. 4 is a logical block diagram illustrating optimizing scan operations for batch-based scan execution, according to some embodiments.

FIG. 4 is a logical block diagram illustrating optimizing scan operations for batch-based scan execution, according to some embodiments. Batch-based scan execution 326 may dynamically optimize scan operations, such as scan operation 402, in order to perform an optimized scan of a batch of records of database by database engine head node 310 within a transaction, in some embodiments. A scan operation 402 may be identified as part of the generation of a query plan (e.g., by query parsing, optimization, and execution 322). For example, a query may be directed to a table, index structure (e.g., a primary or secondary index), or other set of records stored in storage service 220. Scan operation 402 may be identified for the query in order to search for values which are not indexed or located via indexing or other techniques for locating records in a database, in some embodiments, and may be performed on the table, index structure or other set of records of the database.

Batch-based scan execution 326 may be implemented as part of the query planning and optimization logic (e.g., 322) in order to modify scan operation 402 to be performed in batches of records within a transaction, in various embodiments. Batch-based scan execution 326 may implement batch size determination logic 410 to identify a number of records that can be scanned in an individual batch. For example, a data size for processing records within a transaction may be pre-defined by database engine head node configuration settings (which may be modified by a database system administrator, in various embodiments, utilizing APIs, command line controls, a graphical user interface or control panel for a database engine head node 310 implemented as part of database service 210) which indicates a maximum size that a batch of records can be. Tuning the batch size may allow for an administrator to increase the performance gains that can be obtained by scanning a batch of records within a single transaction (as the costs of operations can be divided amongst a larger number of records), in some embodiments. Batch size determination 410 may then determine a number of records that can be scanned up to that data size based on schema information for the database which can indicate the size (e.g., width in bytes) of a database record (e.g., how much space each field for each respective column in a table occupies) in order to determine a number of records that can be scanned within the batch or portion size, in some embodiments.

Batch operation selection 420 may be implemented in various embodiments to determine which operations are applicable to the records of batch together or need to be individually invoked for each record (or field of a record). For example, as discussed below with regard to FIG. 7, field offset calculations may be applicable for the same field in each record in some instances (e.g., where the field stores a fixed length, non-nullable value adjacent to other fixed-length, non-nullable field values). Field offset operations applied to the batch of records may thus be selected by batch operation selection 420 for one, some, or all fields and/or field offset operations for individual fields may be selected by batch operation selection 420 for one, some, or all fields. Similarly, conversion operations and/or query predicate evaluation operations may also be selected by batch operation selection 420 if the operations can be performed on the batch of records, as discussed in the various scenarios below.

Batch-based scan execution 326 may include just-in-time compilation 430, in some embodiments, in order to dynamically program the operations to accommodate batch-wise operations on records, instead of individual record/field operations. For example, just-in-time compilation 430 may take byte code generated for individual record evaluation operations for query predicates and perform run-time compilation to combine a number of invocations of the individual record operations to according to the number of records in a batch, in one embodiment. In this way, conditional checks (e.g., in a loop) to see if further evaluations need to be performed for other records can be eliminated. Similar techniques can be applied to improve the performance of other batch-wise operations in a transaction, such as for performing format conversion from a storage format (e.g., InnoDB) to a database management system format (e.g., MySQL). Various types of just-in-time compilation techniques may be implemented as part of just-in-time compilation 430, such as low level virtual machine (LLVM) just-in-time compilation techniques, in some embodiments.

FIG. 5 is a logical block diagram illustrating the use of a separate distributed storage system in a database system, according to some embodiments. Optimized scan operations for batch-based scan execution may be performed by retrieving records in batch from the separate distributed storage system on behalf of the database head engine head node (if such records are not stored or maintained in a buffer or cache at the database engine head node, such as data page cache 341). In this example, one or more client processes 510 may store data to one or more databases maintained by a database system that includes a database engine head node 520 and storage service 220. In the example illustrated in FIG. 5, database engine head node 520 includes database engine 560 and client-side driver 540 (which serves as the interface between storage service 220 and database engine 560). In some embodiments, database engine may perform functions such as those performed by query parsing, optimization and execution component 322 and transaction and consistency management component 324 of FIG. 3, and/or may store log records for data pages, schema history, transaction logs and/or undo logs (such as those stored by data page cache 341, transaction log 343, undo log 345, data retention index 347, or lock-free index access 349 of FIG. 3). In various embodiments, database engine head node 520 may have obtained a volume epoch indicator or other identifier from storage service 220 granting access writes to a particular data volume, such as by sending a request to open the data volume to storage service 220.

In this example, one or more client processes 510 may send database requests 515 (which may include read and/or write requests targeting data stored on one or more of the storage nodes 535a-535n) to database tier components 560, and may receive database responses 517 from database tier components 560 (e.g., responses that include write acknowledgements and/or requested data). Each database request 515 that includes a request to write to a data page may be parsed and optimized for execution. Database tier components 560 may either access an cached version of data page(s) in data page cache 341 or may submit read record request(s) 543 to client-side driver (which may request 531 and receive 532 the appropriate data page(s) upon which the write requests are to be performed), in one embodiment. Database tier components 560 may then generate one or more write record requests 541, which may be sent to client-side driver 540 for subsequent routing to storage service 220, in one embodiment.

Client side driver may generate one or more redo log records 531 corresponding to each write record request 541, and may send them to specific ones of the storage nodes 535 of specific protection groups storing the partition user data of user data space to which the write record request pertains in storage service 220, in one embodiment. Client-side driver 540 may generate metadata for each of the redo log records that includes an indication of a previous log sequence number of a log record maintained at the specific protection group. Storage service 220 may return a corresponding write acknowledgement(s) 523 for each redo log record 531 to database engine head node 520 (e.g., to client-side driver 540), in one embodiment. Client-side driver 540 may pass these write acknowledgements to database tier components 560 (as write responses 542), which may then send corresponding responses (e.g., write acknowledgements) to one or more client processes 510 as one of database query responses 517, in one embodiment.

In this example, each database request 515 that includes a request to read a data page may be parsed and optimized to generate one or more read record requests 543, which may be sent to client-side driver 540 for subsequent routing to storage service 220. In this example, client-side driver 540 may send these requests 531 to specific ones of the storage nodes 535 of storage service 220, and storage service 220 may return the requested data pages 532 to database engine head node 520 (e.g., to client-side driver 540), in one embodiment. Client-side driver 540 may send the returned data pages to the database tier components 560 as return data records 544, in one embodiment.

In some embodiments, various error and/or data loss messages 534 may be sent from storage service 220 to database engine head node 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of storage service 220 and the APIs 541-545 of client-side driver 540 may expose the functionality of the storage service 220 to database engine head node 520 as if database engine head node 520 were a client of storage service 220. For example, database engine head node 520 (through client-side driver 540) may write redo log records or request data pages through these APIs to perform (or facilitate the performance of) various operations of the database system implemented by the combination of database engine head node 520 and storage service 220 (e.g., storage, access, change logging, recovery, and/or space management operations). As illustrated in FIG. 5, storage service 220 may store data blocks on storage nodes 535a-535n, each of which may have multiple attached SSDs. In some embodiments, storage service 220 may provide high durability for stored data block through the application of various types of redundancy schemes, in one embodiment.

The database service and storage service discussed in FIGS. 2 through 5 provide examples of a database that may perform transactional scanning of portions of a database. However, various other types of data stores or databases (e.g., database systems that do not utilize a separate storage system) that perform scan operations in order to perform a query to a database may implement transactional scanning of portions of a database. FIG. 6 is a high-level flowchart illustrating various methods and techniques to implement transactional scanning of portions of a database, according to some embodiments. Various ones of the embodiments described above may implement the techniques discussed below with regard to FIGS. 6 and 7. Similarly, various modifications to the techniques discussed below may be made according to techniques or components discussed above.

As indicated at 610, a query may be received for a database, in various embodiments. The query may be received via a programmatic interface (e.g., an API) or other query interface, such as JDBC or ODBC driver connection between a client computer and a database server, in some embodiments. The query may be specified according to a query language, protocol, or format, such as Structured Query Language (SQL), in some embodiments. The query may identify one or more objects within the database to query, such as various tables or indexes (including secondary indexes) along with predicates selecting what data is to be returned or operated upon, and various operations to performed (e.g., aggregations such as summations or groupings), in some embodiments.

In order to perform the query, various operations may be identified and selected according to query planning techniques, in some embodiments. Query planning may perform cost-based optimization in order to generate and select a plan (including one or more operations to perform the query) based on the costs (e.g., processing time, I/O costs, etc.) of different alternative plans in order to select the plan. Operations may include sorting, joining, and scanning, among other operations.

For queries that trigger the performance of a scan, techniques to implement transactional scanning of portions of the database may be applied in order to reduce the costs of performing a scan, as discussed above with regard to FIG. 1. Scan operations may scan the underlying tables of a database (e.g., full table scans) or indexes or other structures that link, associate, project, or mirror values from underlying database tables (e.g., secondary indexes). Scan operations may be limited to a range of the database (e.g., range scans) that do not perform a scan of a full table or other structure, in some embodiments, but for which transactional scanning may still provide significant performance improvements.

Transactional scanning may begin by selecting a group or other portion of records of the database to perform a scan within a transaction. As indicated at 620, a scan of the portion of the records may be performed within a transaction to cause a scan of the portion of records to be performed, in various embodiments. The portion may be identified according to portion or batch size for performing scans which may identify a number of records according to data size, as discussed below, in some embodiments. In some embodiments, portions may be identified according to the structures, groupings, or locations of the records in storage (e.g., the records in a page or a block may be a portion, in some embodiments). A full table scan, for instance, may begin by selection a portion of records to scan that includes the first record, and adjacent records, of the table according to a logical ordering imposed on the records of the table (e.g., a sorted order according to a primary key value). The scan of the of selected portion of records of the database may be performed within the transaction, preventing other operations (e.g., other queries, access, requests, or system operations) from modifying the portion of records being scanned) according to the concurrency control mechanisms (e.g., mutexes, locks, etc.) implemented as part of enforcing the transaction. As discussed below with regard to FIG. 7, different operations to evaluate the records with respect to the scan, including such as examples as determining or updating cursor or location information, offset calculation, storage format conversion, and/or field value evaluation, may be performed on the records of the portion together as a group, instead of record-by-record. In some embodiments, different operations may be performed upon the group of records instead of individually according to optimization decisions that select which operations can be performed in group-wise fashion, in some embodiments, as discussed above with regard to FIG. 4. Thus, different queries to the same database (or different databases) may result in different types of operations being included in the transaction that scan records as a group even though the scan operations may be carried out by the same query engine, such as database engine head node 310 in FIG. 3.

As indicated at 630, scanning may continue if another portion of the database needs to be scanned in order to perform the query, in various embodiments. Selecting the next portion of the query to scan may be made by identifying the next adjacent portion (or next portion according to the ordering and/or structure of records being scanned), in some embodiments. A b-tree structure, for index may perform traversal operations between different child (leaf) nodes of an index in order to scan the index, in some embodiments.

In addition to scanning, other operations may be performed in between scanning portions or after all portion scans are complete in some embodiments, such as joins or aggregations. As indicated at 640, a result of the query may be provided based, at least in part, on the scan(s) of the portion(s) database, in various embodiments. For example, record values from the database obtained as part of the scan may be returned, and or used, to perform joins, aggregations, or other operations that are then returned as a result of the query, in various embodiments.

Figure 7:
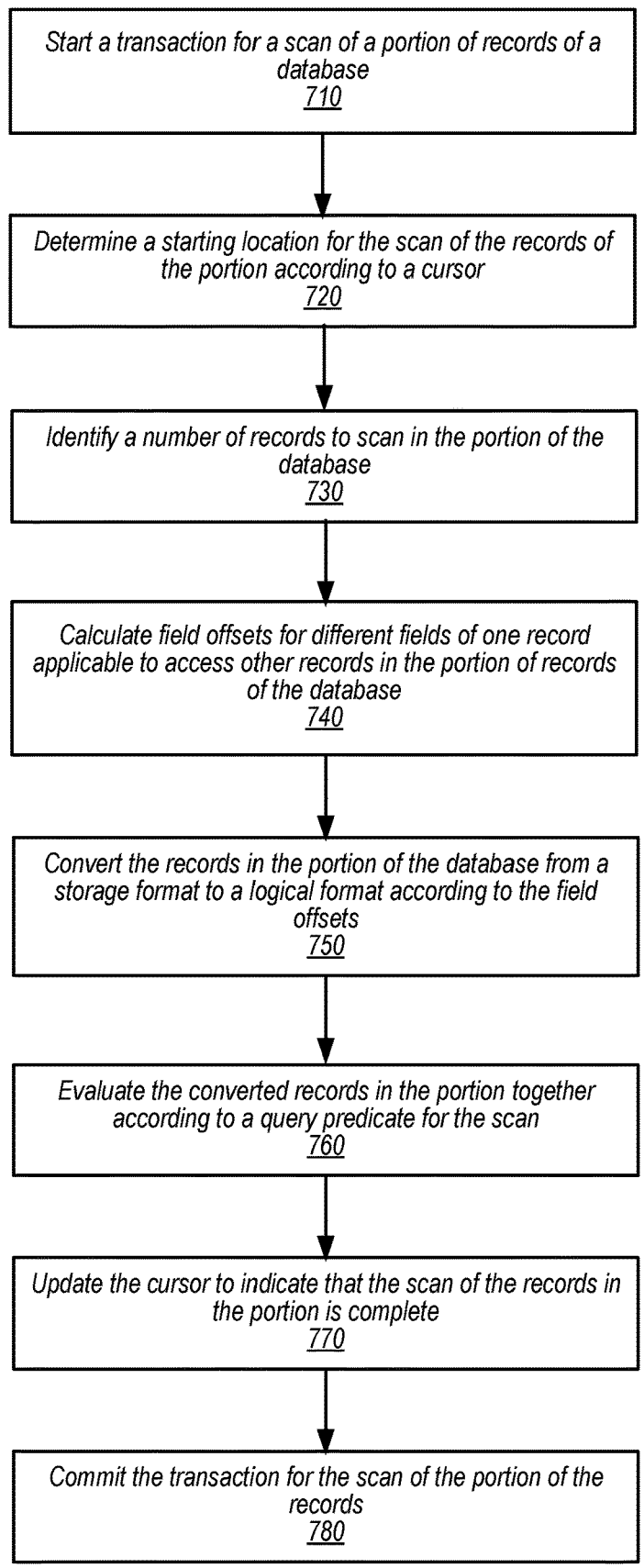
FIG. 7 is a high-level flowchart illustrating various methods and techniques to implement scan operations within a transaction for a portion for a portion of database, according to some embodiments.

FIG. 7 is a high-level flowchart illustrating various methods and techniques to implement scan operations within a transaction for a portion of database, according to some embodiments. As indicated at 710, a transaction may be started for a scan of a portion of records of a database, in various embodiments. For example, transaction semantics may be initiated by invoking a "START" method, function, library or other initiation mechanism to identify the beginning of a transaction (e.g., using MySQL's mini-transaction functionality invoked by "mtr_start"), in one embodiment. Other concurrency controls (e.g., locks, mutexes, etc.) may be used to prevent access to the records (and/or records dependent or associated with the records being scanned such as parent nodes in an index structure) upon which the scan operations may be performed, in some embodiments.

Different types of location information for moving through records in a database may be maintained, in some embodiments. For example, as indicated at 720, a starting location for the scan of the records in the portion of the database may be determined according to the cursor, in one embodiment. A cursor may be a data structure implemented to track or store the progress or state of a scan (e.g., indicating which record, page, or block should be scanned next by storing an address or other location/identification information). The start location may be determined according to an indication of the last scanned record identified in the cursor, in some embodiments. In other embodiments, other data structures or tracking information may be used to maintain the state or progress of the scan, and, therefore, the previous example is not intended to be limiting.

As indicated at 730, a number of records to scan in the portion of the database may be identified, according to some embodiments. For example, a batch or portion size for processing records within a transaction may be pre-programmed for a query engine that scans portions of a database within a transaction (e.g., 1 MB). The number of records that can be scanned up to that portion size may then be determined based on schema information for the database (e.g., column types, such as fixed length types (e.g., integers) or variable length types (e.g., strings), number of columns, whether columns may hold a null value) all may be used to determine the width of database record (e.g., how much space each field for each respective column in a table occupies) in order to determine a number of records that can be scanned within the batch or portion size, in some embodiments. A same batch size (e.g., 1 MB) may allow for 800 records to be scanned in one table and only 55 records to be scanned in another table (where the records are much wider), for instance.

For the identified records in the portion of the database to scan, according to the elements discussed above with regard to elements 720 and 730, different operations can be invoked within a transaction that are invoked and/or are otherwise applicable to perform the scan of the records. As indicated at 740, for example, in some embodiments, field offsets may be calculated for fields of a record applicable to access other records in the portion of records of the database. Because different fields may be different sizes (according to the type of data value of the column to which a field belongs), field offsets may identify the locations of individual fields within a record by identifying where one field ends and the adjacent field begins. Determining field offsets calculated for the one record applicable to each of the other records in the portion can reduce the cost of performing field offset calculation to a single instance for each column being scanned, instead of performing field offset calculation for each field in each record within a the portion (which would significantly increase overhead costs due to branching), in some embodiments. In some embodiments, offset calculations may be applicable to each of the same fields in the records of the scanned portion while other offsets may be have be to be individually calculated for each field of a record. For example, system fields, or other fixed-length non-nullable fields that occur before a variable-length or nullable field may be identified so that the offset for the system fields, or other fixed-length non-nullable fields, may be applicable (and thus reused) without invoking a new offset field calculation for the each record in the portion being scanned, in one embodiment.

As indicated at 750, the records in the portion of a database may be converted from a storage format to a logical format according to the calculated field offsets as a batch, in some embodiments. For example, records of a database may be stored in a storage system (e.g., a disk-based storage device) according to a format that can be interpreted and accessed by a storage engine, such as InnoDB. The storage format may include metadata describing a record, such as a header, prefix, or other information that describes the offset of the next record in the page, block, or larger storage structure that includes the current record, a type for the record, an indication to whether a field can be null value (e.g., in a bitmap) or variable length, among other information, in some embodiments. For the purposes of performing a query, the values of fields themselves may need to be determined and provided to other components for query evaluation so that the fields can be evaluated in order to perform the operations of the query (including a scanning operation), in various embodiments. Therefore, conversion from the storage format to the logical format or structure of the database being considered (e.g., the table, index structure, or other collection of records being scanned) may be performed order to make the field values of a record (as opposed to metadata or information that may not be visible to or queryable by the user, such as system data) available to perform the query, in various embodiments.

Like other scanning operations, format conversion may be performed as a batch operation, instead of individually for each records, in some embodiments. For example, the offsets determined for the records being the same may allow for a conversion operation to receive a vector, array, or other group of record values (e.g., for a column) to be converted, instead of individually. In some embodiments, just-in-time compilation techniques, as discussed above with regard to FIG. 4 may be implemented in order to dynamically specify the execution of conversion functions, methods, or other mechanisms that may be invoked when performing the scan in order to dynamically program the performance of the conversion operations to convert the identified number and/or types of fields according to the calculated offsets (e.g., loop unrolling according to the identified number of records and size of the data types of the fields). In some embodiments, constant binding for arguments, parameters, or other information may be used to implement just-in-time compilation of conversion operations, (e.g., specifying as constant binding values for "mode", "match_mode", and "direction" if applying just-in-time compilation techniques to MySQL search operations utilized for a scan).

Evaluation of converted records together according a query predicate for the scan may also be performed as part of the transaction, as indicated at 760, in some embodiments. For example, instead of performing record-by-record evaluation of the field values being evaluated in a predicate for the scan (e.g., where "field value>X"), the field values may be evaluated as a group, in some embodiments. The field values may be input to evaluation functions as vectors, arrays, or other groupings in a single invocation of the evaluation function, in one embodiment. In some embodiments, the group evaluation functions may receive as input parameters information for handling null values (e.g., such as a bitmap). Again, as discussed above with regard to FIG. 4, just-in-time compilation techniques may also be applied to in order to dynamically program the evaluation functions for the data type to evaluate the converted records as a group.

As discussed above with regard to FIG. 4, an optimized scan of a database may include a determination of different operations to perform as a batch operation. Field offset operations or format conversion operations may be examples of operations which in scenarios where the field offsets of the one record are applicable to the fields of other records in the portion of the database being scanned within the transaction. However, in some scenarios (e.g., where fields may have variable lengths (due to variable length data types, such as strings, or the ability to store a null value), the fields of each record within a portion being scanned may not have the same offsets, and thus elements 740 and 750 may not be invoked or applicable in a single instance for all records of the portion (e.g., a single instance for each field and/or a single instance of converting the field) but may instead be performed within the transaction (e.g., between elements 710 and 780) individually for each field of each record. Similarly group evaluation of records with respect to a query predicate, as discussed above with regard to element 760, may not be selected or performed for all scans, and thus in some embodiments, query predicate evaluations may be performed on a record-by-record basis. Performance costs for other operations performed within the transaction, such as concurrency operation savings invoked by performing a transaction for a group of records, instead of a single record, and/or for accessing and updating cursor information (e.g., at elements 720 and 770) may still be invoked once for the group of records in the portion of the database (instead of individual records), and still result in performance savings over scanning techniques that scan records individually. Thus, the combination of operations illustrated in FIG. 7 is not limiting as to other groups or selections of scan operations included within a transaction that are performed upon the group of records being scanned.

As indicated at 770, the cursor may be updated to indicate that the scan of the records in the portion is complete, in some embodiments. For example, the next record identifier may be set to indicate a next record to scan adjacent to the last record of the group of records scanned in the portion of the database (in a logical or physical ordering of records of the database, such as may be specified according to an index). As indicated at 780, the transaction may be committed for the scan of the portion of records, in various embodiments. For example, transaction semantics may be initiated by invoking a "COMMIT" method, function, library or other initiation mechanism to identify the beginning of a transaction (e.g., using MySQL's mini-transaction functionality invoked by "mtr_commit"), in one embodiment. Similarly, other concurrency controls (e.g., locks, mutexes, etc.) may be released, returned, or otherwise reconfigured to allow access to the records (and/or records dependent or associated with the records being scanned such as parent nodes in an index structure) upon which the scan operations may be performed, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 8:
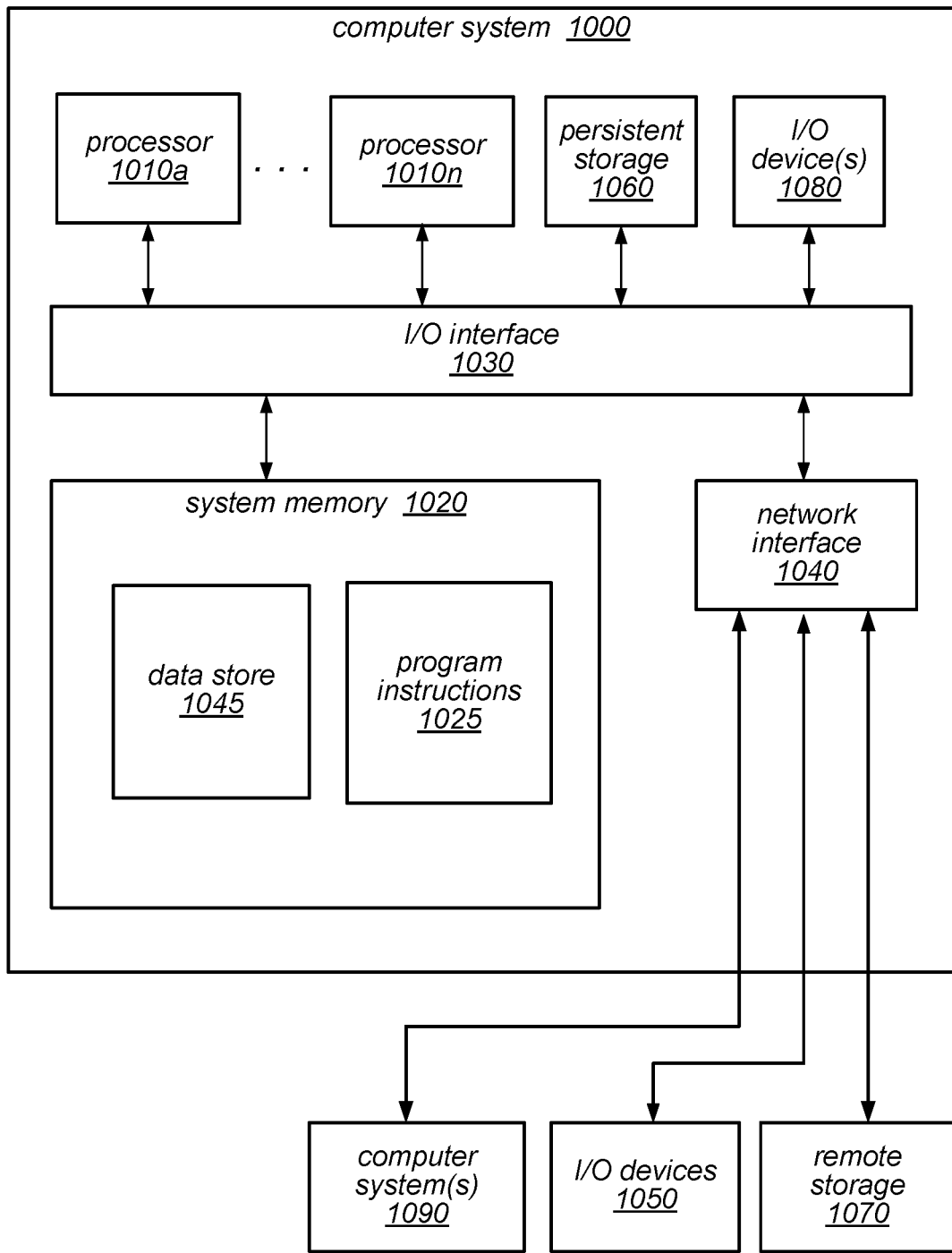
FIG. 8 is an example computer system, according to various embodiments.

FIG. 8 is a block diagram illustrating a computer system to implement transactional scanning of portions of a database, as well as various other systems, components, services or devices described above. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, computing node, or electronic device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a query for a database at a database engine from a client; and
responsive to the query:
start, by the database engine, a first transaction to perform one or more scan operations of a first portion of records stored in the database as part of a scan of the records stored in the database, wherein starting the first transaction prevents other access to the first portion of the records;
perform, by the database engine, the one or more scan operations to scan the first portion of the records within the scan, wherein the first portion includes multiple records;
after performance of the one or more scan operations of the multiple records in the first portion of records, commit, by the database engine, the first transaction for the scan of the first portion of records to allow other access to the first portion of the records; and
send, by the database engine, a result of the query based, at least in part, on the scan of the first portion of records of the database.

2. The system of claim 1, wherein to perform the scan of the first portion of records, the program instructions cause the at least one processor to perform the method to at least calculate field offsets for one or more fields of one record in the first portion of records applicable to access other records in the portion of records of the database.

3. The system of claim 2, wherein to perform the scan of the first portion of records, the program instructions further cause the at least one processor to perform the method to at least convert the records in the first portion of the database from a storage format to a logical format according to the field offsets for the one or more fields.

4. The system of claim 1, wherein the database engine is implemented as a database engine head node of a network-based database service, wherein the database is stored in a network-based storage service, and wherein to perform the scan of the first portion of records, the program instructions cause the at least one processor to perform the method to at least send a request for one or more data pages that store the first portion of records to the network-based storage service.

5. A method, comprising:
receiving a query for a database from a client; and
responsive to the query:
preventing access to a first portion of records stored in the database in order to perform one or more scan operations within a first transaction of as part of a scan of the records stored in the database;
performing the one or more scan operations to scan the first portion of the records of the database within the scan, wherein the first portion includes multiple records of the database;
after performance of the one or more scan operations of the multiple records in the first portion of records to complete the first transaction, allowing other access to the first portion of the records; and
providing a result of the query based, at least in part, on the scan of the first portion of records of the database.

6. The method of claim 5, wherein performing the scan of the first portion of records comprises:
determining a starting location for the scan of the first portion of records according to a cursor; and
updating the cursor to indicate that the scan of the first portion of records is complete.

7. The method of claim 5, wherein performing the scan of the first portion of records comprises identifying a number of records to scan as the first portion of records in the database.

8. The method of claim 5, wherein performing the scan of the first portion of records comprises calculating field offsets for one or more fields of one record in the first portion of records applicable to access other records in the portion of records of the database.

9. The method of claim 8, wherein performing the scan of the first portion of records further comprises converting the records in the first portion of the database from a storage format to a logical format according to the field offsets for the one or more fields.

10. The method of claim 5, wherein performing the scan of the first portion of records comprises evaluating the portion of records together according to a query predicate for the scan.

11. The method of claim 10, wherein at least one or more program instructions that cause the evaluating the portion of records together according to the query predicate for the scan are compiled by a just-in-time compiler.

12. The method of claim 5, further comprising:
starting the transaction before performing the scan of the first portion of records; and
committing the transaction after performing the scan of the first portion of records.

13. The method of claim 5, wherein the scan is a scan of an index for the database or a table of the database.

14. A non-transitory, computer-readable storage medium, storing program instructions that when executed by one or more computing devices cause the one or more computing devices to implement:
receiving a query for a database from a client; and
responsive to the query:
preventing access to a first portion of records stored in the database in order to perform one or more scan operations within a first transaction of as part of a scan of the records stored in the database;
performing the one or more scan operations to scan the first portion of the records of the database within the scan according to a plan generated for the query, wherein the first portion includes multiple records of the database;

after performance of the one or more scan operations of the multiple records in the first portion of records to complete the first transaction, allowing other access to the first portion of the records; and providing a result of the query based, at least in part, on the scan of the first portion of records of the database.

15. The non-transitory, computer-readable storage medium of claim 14, wherein, in performing the scan of the first portion of records, the program instructions cause the one or more computing devices to implement:

determining a starting location for the scan of the first portion of records according to a cursor; and updating the cursor to indicate that the scan of the first portion of records is complete.

16. The non-transitory, computer-readable storage medium of claim 14, wherein, in performing the scan of the first portion of records, the program instructions cause the one or more computing devices to implement calculating field offsets for one or more fields of one record in the first portion of records applicable to access other records in the portion of records of the database.

17. The non-transitory, computer-readable storage medium of claim 16, wherein, in performing the scan of the first portion of records, the program instructions cause the one or more computing devices to further implement:

responsive to determining that the one or more fields of the one record are applicable to access the other records, calculating the field offsets for the one or more fields of the one record in the first portion of records.

18. The non-transitory, computer-readable storage medium of claim 16, wherein, in performing the scan of the first portion of records, the program instructions cause the one or more computing devices to implement converting the records in the first portion of the database from a storage format to a logical format according to the field offsets for the one or more fields.

19. The non-transitory, computer-readable storage medium of claim 18, wherein at least a portion of the program instructions that cause the one or more computing devices to implement converting the records in the first portion of the database from a storage format to a logical format according to the field offsets for the one or more fields are compiled by a just-in-time compiler.

20. The non-transitory, computer-readable storage medium of claim 14, wherein performing the scan of the first portion of records comprises evaluating the portion of records together according to a query predicate for the scan.

* * * * *